(12) United States Patent
Shibuya

(10) Patent No.: US 9,940,184 B2
(45) Date of Patent: Apr. 10, 2018

(54) ANOMALY DETECTING METHOD, AND APPARATUS FOR THE SAME

(71) Applicants: Hitachi High-Technologies Corporation, Tokyo (JP); Hitachi Power Solutions Co., Ltd., Ibaraki (JP)

(72) Inventor: Hisae Shibuya, Tokyo (JP)

(73) Assignees: HITACHI HIGH-TECHNOLOGIES CORPORATION, Tokyo (JP); HITACHI POWER SOLUTIONS CO., LTD., Ibaraki (JP)

( * ) Notice: Subject to any disclaimer, the term of this patent is extended or adjusted under 35 U.S.C. 154(b) by 654 days.

(21) Appl. No.: 14/568,268

(22) Filed: Dec. 12, 2014

(65) Prior Publication Data
US 2015/0169393 A1    Jun. 18, 2015

(30) Foreign Application Priority Data
Dec. 13, 2013    (JP) ................................ 2013-258215

(51) Int. Cl.
| | | |
|---|---|---|
| G06F 11/00 | (2006.01) | |
| G05B 23/02 | (2006.01) | |
| G06N 99/00 | (2010.01) | |

(52) U.S. Cl.
CPC .......... *G06F 11/00* (2013.01); *G05B 23/0235* (2013.01); *G05B 23/0243* (2013.01); *G05B 23/0281* (2013.01); *G06N 99/005* (2013.01)

(58) Field of Classification Search
CPC ... G06F 11/00; G06N 99/005; G05B 23/0281; G05B 23/0243; G05B 23/0235
(Continued)

(56) References Cited

U.S. PATENT DOCUMENTS

| | | | |
|---|---|---|---|
| 8,682,824 B2 | 3/2014 | Shibuya et al. | |
| 2012/0271587 A1* | 10/2012 | Shibuya | G05B 23/0229 702/127 |
| 2012/0290879 A1* | 11/2012 | Shibuya | G06N 99/005 714/26 |

FOREIGN PATENT DOCUMENTS

| | | |
|---|---|---|
| EP | 2477086 A1 | 7/2012 |
| JP | 2011-70635 A | 4/2011 |
| JP | 5342708 B1 | 11/2013 |

OTHER PUBLICATIONS

Extended European Search Report, dated Jun. 23, 2015, which issued during the prosecution of European Application No. 14197018.6, which corresponds to the present application.
(Continued)

*Primary Examiner* — Bo Fan
(74) *Attorney, Agent, or Firm* — Baker Botts L.L.P.

(57) ABSTRACT

In an anomaly detecting method by using multi-dimensional time series sensor signals including, generating anomaly model by using data of a learning period including neither that period nor any exclusion candidate period, calculating anomaly measurements on the basis of the distance from the normal model and, making a period containing the maximum anomaly measurement value but no exclusion candidate period, learning exclusion periods and anomaly determining thresholds are determined as learned data on the basis of the result in each round, generates anomaly model data in a learning period except learning-exclusion periods regarding acquired data or data in a designated evaluation period, an anomaly measurement at each time point is calculated on the basis of the distance from the normal model, and data at each time point is determined to be anomaly or normal by comparing the anomaly measurements with anomaly determining thresholds.

9 Claims, 14 Drawing Sheets

(58) Field of Classification Search
USPC ........ 702/182; 715/753; 705/14.53; 712/208
See application file for complete search history.

(56) References Cited

OTHER PUBLICATIONS

Communication pursuant to Article 94(3) EPC, dated Aug. 26, 2016, which issued during the prosecution of European Application No. 14197018.6, which corresponds to the present application.
Communication pursuant to Article 94(3) EPC, dated Apr. 4, 2017, which issued during the prosecution of European Application No. 14197018.6, which corresponds to the present application.
Notification of Reasons for Refusal, dated Jun. 13, 2017, which issued during the prosecution of Japanese Application No. 2013-258215, which corresponds to the present application (English translation attached).

* cited by examiner

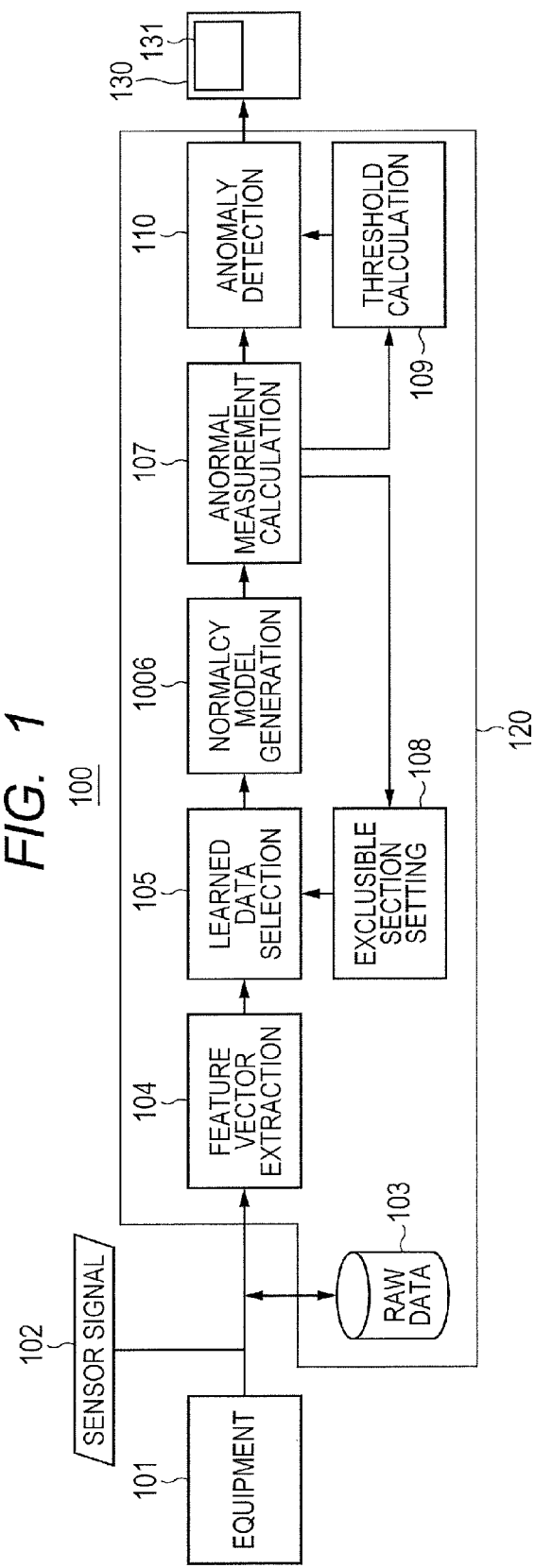

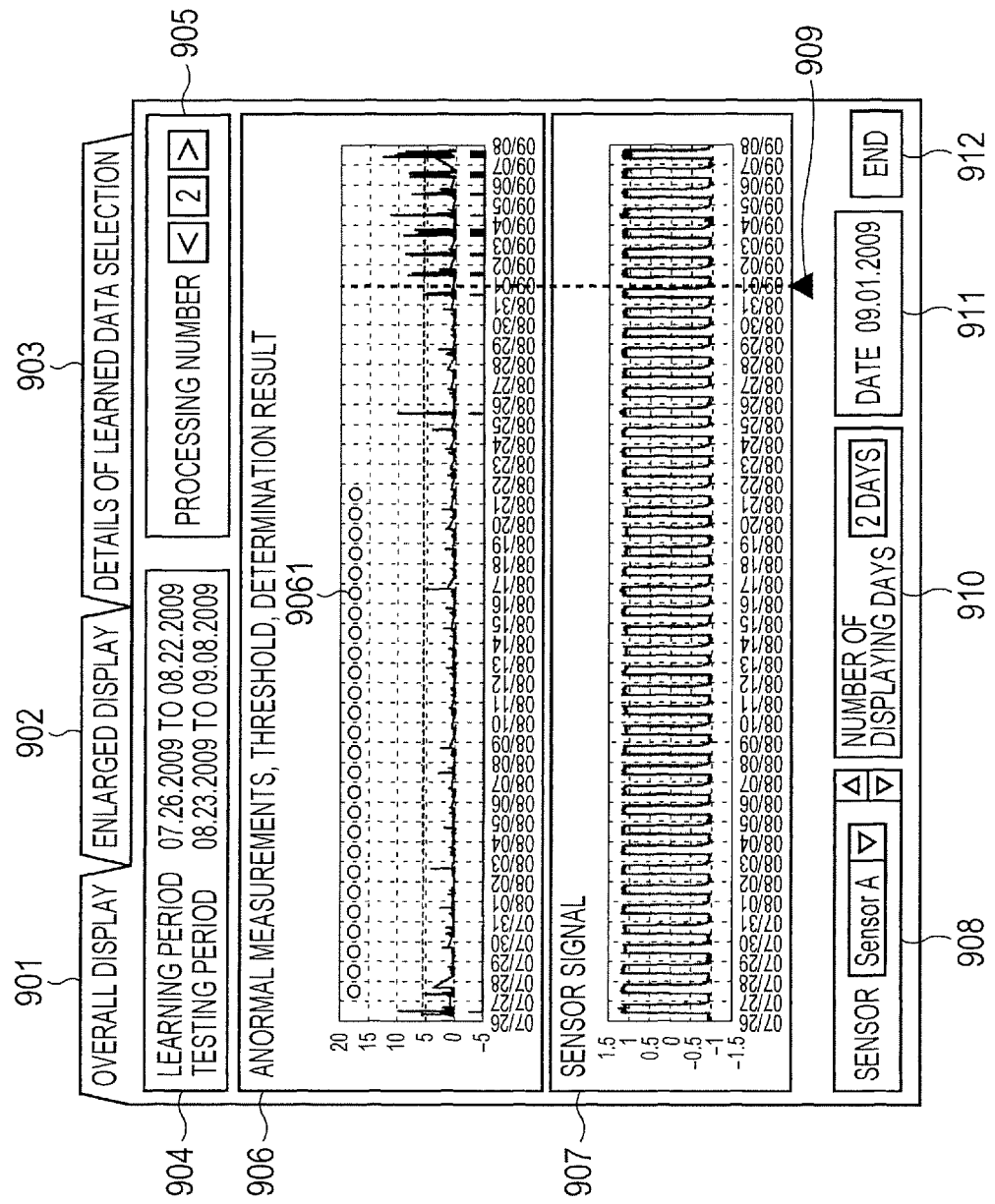

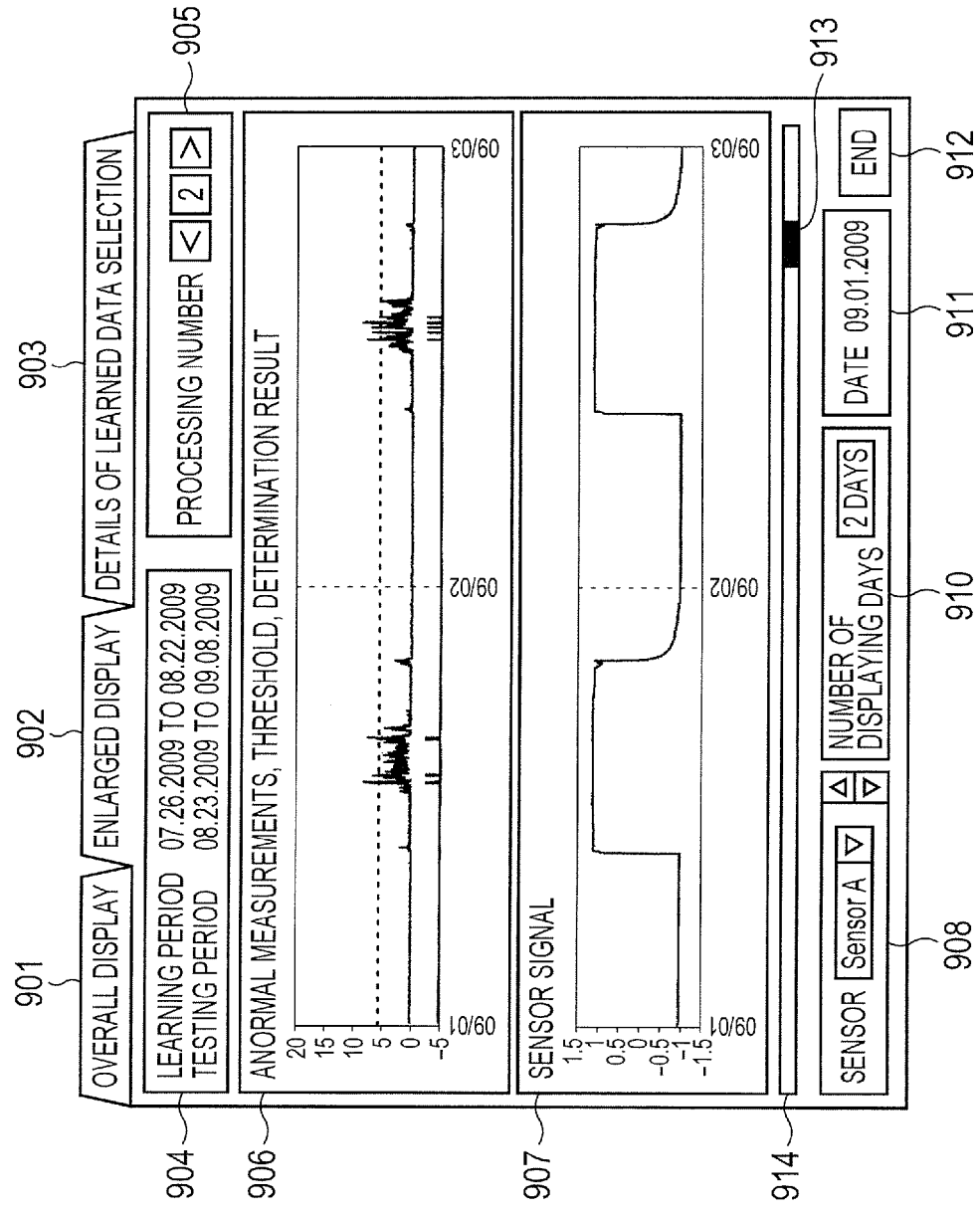

FIG. 10

| CHOSEN | NUMBER | LEARNING PERIOD | | TESTING PERIOD | | CHOSEN SENSOR NUMBER | PARAMETERS | LEARNING-EXCLUDED DAY | THRESHOLD | NUMBER OF DAYS OF ANOMALY |
|---|---|---|---|---|---|---|---|---|---|---|
| | | START | END | START | END | | | | | |
| ☐ | 1 | 7/26/09 | 8/22/09 | 8/23/09 | 9/7/09 | 1, 2, 3, 5, 6 | NUMBER OF NEARBY VECTORS = 10<br>MAKING CANONICAL = 10e-4<br>THRESHOLD RATIO = 1.0<br>N = 4, M = 1, Δ = 1.0 | | 5.5 | 10 |
| ☐ | 2 | 7/26/09 | 8/22/09 | 8/23/09 | 9/7/09 | 1, 2, 3, 5, 6 | NUMBER OF NEARBY VECTORS = 10<br>MAKING CANONICAL = 10e-4<br>THRESHOLD RATIO = 1.0<br>N = 4, M = 1, Δ = 0 | 7/26/09 | 4.6 | 12 |
| ☑ | 3 | 7/26/09 | 8/22/09 | 8/23/09 | 9/7/09 | 2, 3, 5, 6 | NUMBER OF NEARBY VECTORS = 10<br>MAKING CANONICAL = 10e-4<br>THRESHOLD RATIO = 1.0<br>N = 1, M = 0, Δ = 0 | 7/26/09<br>7/27/09<br>8/16/09 | 9.2 | 1 |
| ☐ | 4 | 7/26/09 | 8/22/09 | 8/23/09 | 9/7/09 | 2, 3, 6 | NUMBER OF NEARBY VECTORS = 10<br>MAKING CANONICAL = 10e-4<br>THRESHOLD RATIO = 1.0<br>N = 1, M = 0, Δ = 0 | | 8.3 | 3 |

DETAILED DISPLAY   REGISTER   BACK

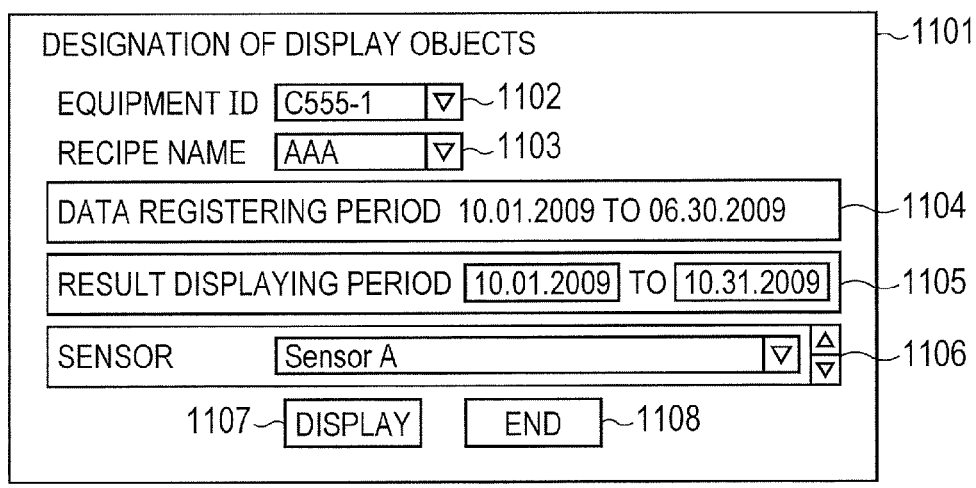

| DAY/HOURS | CODE | MESSAGE |
|---|---|---|
| 2/14/2010 17:13:38 | 1231 | Request module on |
| 2/14/2010 17:17:25 | 1249 | Starter on |
| 2/14/2010 17:17:29 | 3225 | Ignition on |
| 2/14/2010 17:17:48 | 1250 | Starter off |
| 2/14/2010 17:17:52 | 2124 | Idle |
| 2/14/2010 17:17:53 | 2136 | Speed setpoint input-internal (DIA. NE) |
| 2/14/2010 17:18:00 | 1233 | Operation on |
| 2/14/2010 17:20:53 | 1256 | Acknowledgement |
| 2/14/2010 17:21:59 | 1234 | Operation off |

| 1501 | 1502 | 1503 |
|---|---|---|
| Sensor. A | < | −100 |
| Sensor. D | ≥ | 500 |

ANOMALY DETECTING METHOD, AND APPARATUS FOR THE SAME

CLAIM OF PRIORITY

The present application claims priority from Japanese Patent Application JP 2013-258215 filed on Dec. 13, 2013, the content of which is hereby incorporated by reference into this application.

BACKGROUND OF THE INVENTION

1. Field of the Invention

The present invention relates to an anomaly detecting method and an anomaly detecting apparatus that can accomplish early detection of any anomaly on the basis of multi-dimensional time series data outputted by a plant or facility.

2. Description of the Related Art

Electric power companies are utilizing waste heat from gas turbines or like energy sources for supplying warm water for use in district heating or high- or low-pressure steam to factories. Petrochemical companies operate gas turbines or the like as power supply plants. In such plants and facilities using gas turbines, it is extremely important to detect any anomaly or any sign of anomaly in their equipment in order to minimize the consequent social damage.

Not only gas turbines and steam turbines, but also water wheels in hydropower stations, nuclear reactors in nuclear power stations, windmills of wind power stations, engines of aircraft and heavy machinery, railway rolling stock and tracks, escalators, elevators, medical diagnosing systems including MRI and X-ray CT and, at the individual machine or component level, mounted batteries, to cite but a few examples of numberless relevant cases, require such preventive maintenance against their deterioration and aging.

For this reason, a plurality of sensors are fitted to a facility or equipment to be monitored, and normal or anomaly is determined in accordance with monitoring standards for each individual sensor.

Japanese Patent Application Laid-Open No. 2011-70635 (Patent Document 1) discloses an anomaly detecting method to detect the presence or absence of anomaly on the basis of anomaly measurements calculated by comparison with normal data on past performance and generate a normal model by local subspace classification method. Since anomaly detecting method based on a normal model involves the problem that the sensitivity is affected by the quality of learned data, normal data has to be collected comprehensively and accurately. The comprehensiveness requirement can be met by extending the period of learning. Regarding accuracy, invasion of any anomaly would make it impossible to set an appropriate threshold and invite a drop in sensitivity, anomaly data should be automatically excluded from the learned data.

To meet this requirement, Japanese Patent Application Laid-Open No. 2011-70635 (Patent Document 1) discloses a method by which averages and variances of different features and different periods are used as the basis and learning data of periods deviating from this basis are excluded and another method by which learning data deviating more frequently than a threshold from a single-period waveform model for each feature is excluded. Patent Document 1 also discloses a method by which a plurality of normal models are generated by sampling normal data period by period, the presence or absence of any anomaly is determined by averaging a top few of anomaly measurements calculated by using the models, and learned data of periods containing anomaly values is excluded.

SUMMARY OF THE INVENTION

The anomaly detecting method by which the presence or absence of anomaly is detected on the basis of average and variance in each individual period and another anomaly detecting method by which the presence or absence of anomaly is detected on the basis of the number of times of deviation from a single-period waveform model for each feature, both being stated in Patent Document 1, involves the problem of difficulty of application to any other equipment than what operates regularly. Still another method based on a plurality of normal models generated by random sampling involves the problem of taking a long time for calculation.

The present invention is intended to address these problems and provide an anomaly detecting method and an anomaly detecting apparatus that can appropriately exclude by a simple method any anomaly data found in learned data in order to set a proper threshold for anomaly detection based on a normal model using multi-dimensional time series sensor signals.

To address the problem noted above, the invention provides a method of detecting anomaly in a facility or apparatus by using multi-dimensional time series sensor signals outputted from sensors fitted to the facility or apparatus during operation, comprising a step of generating a normal model by using sensor signals in a pre-designated period out of the multi-dimensional time series sensor signals and calculating anomaly determining thresholds; a step of extracting feature vectors from the multi-dimensional time series sensor signals as observed vectors; a step of calculating anomaly measurements of the observed vectors by using the extracted observed vectors and the generated normal model; and a step of detecting any anomaly in the facility or apparatus by comparing the calculated anomaly measurements of the observed vectors and the anomaly determining thresholds, whereby the normal model is generated by using the multi-dimensional time series sensor signals cleared of signals of some periods in the pre-designated period out of all the multi-dimensional time series sensor signals.

Also, to address the problem noted above, the invention provides a method of detecting anomaly in a facility or apparatus by using multi-dimensional time series sensor signals outputted from sensors fitted to the facility or apparatus during operation, comprising a learning step and a step of detecting anomaly, whereby, at the learning step, learned data is generated by excluding signals of some periods from sensor signals in a pre-designated period out of all the multi-dimensional time series sensor signals and anomaly determining thresholds are calculated from the generated learned data and, at the step of detecting anomaly, a normal model is generated by using the learned data; feature vectors are extracted as observed vectors out of the multi-dimensional time series sensor signals; anomaly measurements of the observed vectors are calculated by using the extracted observed vectors and the generated normal model; and any anomaly in the facility or apparatus is detected by comparing the calculated anomaly measurements of the observed vectors and the anomaly determining thresholds.

Also, to address the problem noted above, the invention provides an apparatus to detect anomaly in a facility or apparatus by using multi-dimensional time series sensor signals outputted from sensors fitted to the facility or apparatus during operation, comprising an arithmetic unit that generates a normal model by using sensor signals in a pre-designated period out of the multi-dimensional time series sensor signals and calculating anomaly determining thresholds; an observed vector extracting unit that extracts feature vectors as observed vectors out of the multi-dimensional time series sensor signals; an anomaly measurement calculating unit that calculates anomaly measurements of the observed vectors by using the observed vectors extracted by the observed vector extracting unit and the normal model generated by the calculating unit; and an anomaly detecting unit that compares anomaly measurements of the observed vectors calculated by the anomaly measurement calculating unit and the anomaly determining thresholds calculated by the arithmetic unit and detects any anomaly in the equipment or plant, wherein the arithmetic unit generates the normal model by using the multi-dimensional time series sensor signals cleared of signals of some periods in the pre-designated period out of all the multi-dimensional time series sensor signals.

Further to address the problem noted above, the invention provides an apparatus to detect anomaly in a facility or an apparatus by using multi-dimensional time series sensor signals outputted from sensors fitted to the facility or apparatus during operation, comprising a sensor signal accumulating unit that accumulates the multi-dimensional time series sensor signals; a feature vector extracting unit that extracts feature vectors from the multi-dimensional time series sensor signals; a learned data generating unit that excludes feature vectors in learning exclusion periods from feature vectors in a learning period pre-designated by the feature vector extracting unit and generates learned data; a normal model generating unit that generates a normal model matching a feature vector at each time point by using the time point generated by the learned data generating unit; an anomaly measurement calculating unit that calculates anomaly measurements by using the feature vector at each time point extracted by the feature vector extracting unit and the normal model generated by the normal model generating unit; an excluding period setting unit that sets, on the basis of the anomaly measurements calculated by the anomaly measurement calculating unit, periods to be excluded from the learned data by using the learned data generated by the learned data generating unit, and the normal model generated by the normal model generating unit; a threshold calculating unit that calculates thresholds, regarding the learned data generated by the learned data generating unit, on the basis of the anomaly measurements calculated by the anomaly measurement calculating unit; an anomaly detecting unit that detects any anomaly in the equipment or apparatus by comparing each of the feature vectors calculated by the anomaly measurement calculating unit and thresholds calculated by the threshold calculating unit.

The invention can appropriately exclude anomaly periods from learned data to set low anomaly determining thresholds and realize highly sensitive anomaly detection because, according to the invention, recalculation of anomaly measurements is repeated with periods of high anomaly measurements excluded from learned data and the periods to be excluded from learned data and the anomaly determining threshold are set on the basis of the results of the repeated recalculation.

A system embodying this technique makes possible early detection of anomaly in not only gas turbines and steam turbines, but also water wheels in hydropower stations, nuclear reactors in nuclear power stations, windmills of wind power stations, engines of aircraft and heavy machinery, railway rolling stock and tracks, escalators, elevators, and production facilities in factories and, at the individual machine or component level, deterioration or aging of mounted batteries, or sensing data on human life symptoms as expressed in electroencephalograms or electrocardiograms.

BRIEF DESCRIPTION OF THE DRAWINGS

Other problems, configurations and advantageous effects of the present invention will be made clear by the following description of its embodiments when taken in conjunction with the accompanying drawings, wherein:

FIG. 1 is a block diagram outlining the configuration of an equipment state monitoring system, which is a first embodiment of the invention;

FIG. 2 is a list tabulating examples of sensor signals;

FIG. 9A is a front view of a result display frame in a case showing a plurality of time series of data sets in the equipment state monitoring system, which is the first embodiment;

FIG. 9B is a front view of a result display frame in a case showing on an enlarged scale a plurality of time series of data sets in the equipment state monitoring system, which is the first embodiment;

FIG. 10 is a front view of a display frame showing a list of test results for recipe setting in the equipment state monitoring system, which is the first embodiment;

FIG. 11 is a front view of a display frame showing one example of GUI for designating a result display object in the equipment state monitoring system, which is the first embodiment;

FIG. 12 is an example of period displaying window contained in a result displaying screen in the equipment state monitoring system, which is the first embodiment;

DESCRIPTION OF THE PREFERRED EMBODIMENTS

Figure 3:
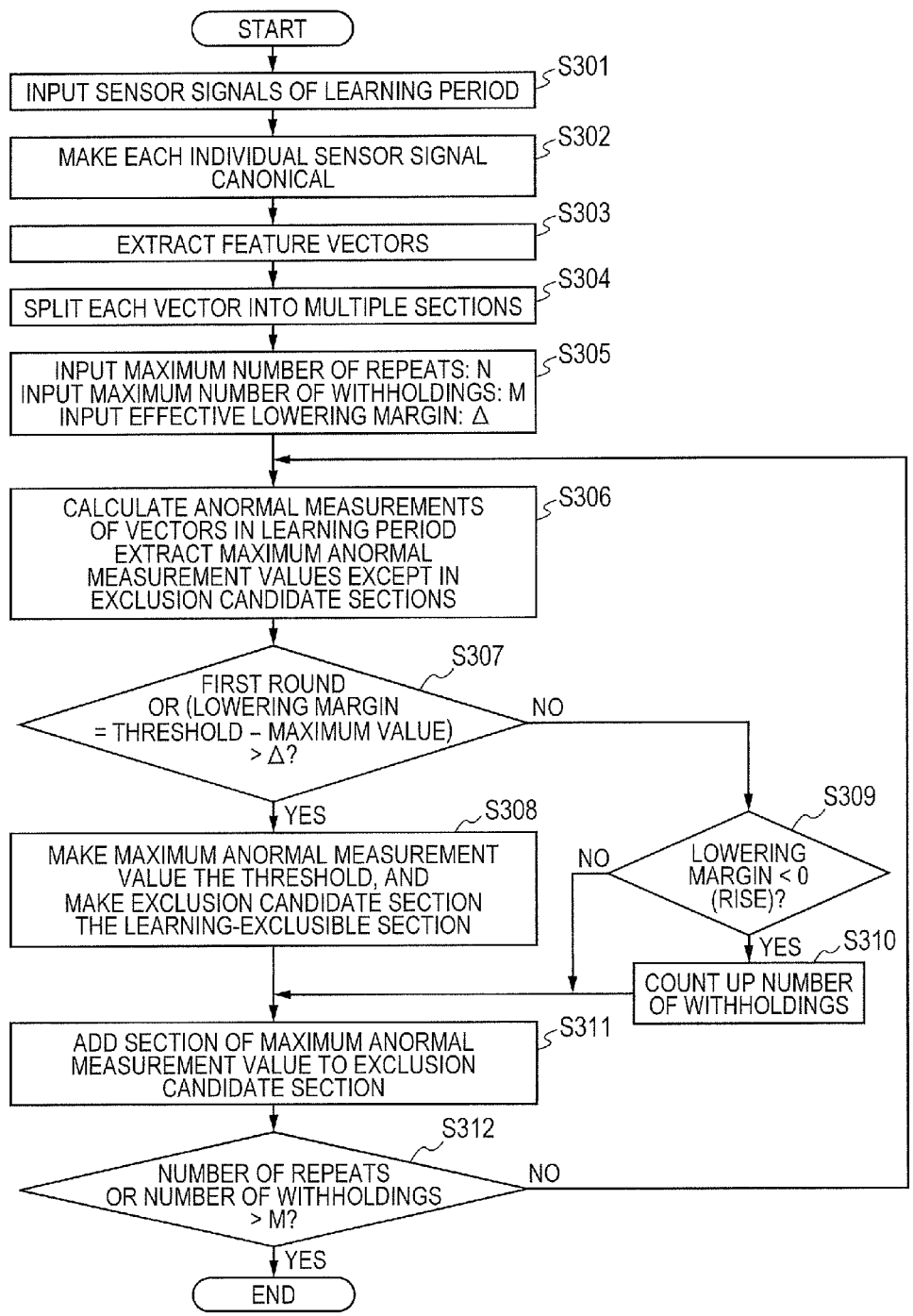
FIG. 3 is a flow chart of processing by the equipment state monitoring system, which is the first embodiment, when engaged in learning.

The present invention makes possible, in the anomaly detecting method and the anomaly detecting apparatus for detecting any anomaly in equipment on the basis of sensor signals outputted from sensors fitted to equipment, setting of low anomaly determining thresholds by appropriately excluding anomaly periods from learned data by consecutive repetition of exclusion of periods of high anomaly measurements from learned data and recalculating anomaly measurements and, on the basis of rounds of such processing, setting periods to be excluded from learned data and anomaly determining thresholds thereby to realize high-sensitivity anomaly detection.

Exemplary embodiments of the invention will be described below with reference to the accompanying drawings.

First Embodiment

FIG. 1 shows an example of configuration of an anomaly detection system 100 for realizing the equipment state monitoring method according to the invention.

This anomaly detection system 100 comprises a sensor signal analyzing unit 120 and an input/output unit 130. The sensor signal analyzing unit 120 further comprises a sensor signal storing unit 103 that accumulates as raw data sensor signals 102 outputted from equipment 101; a feature vector extracting unit 104 that extracts feature vectors on the basis of the sensor signals 102; a learned data selecting unit 105 that excludes feature vectors in learning-excluded periods from the feature vectors of a pre-designated learning period; a normal model generating unit 106 that generates a normal model matching a feature vector matching each of different time points by using the selected learned data; an anomaly measurement calculating unit 107 that sets anomaly measurements on the basis of the feature vectors at different time points and the generated normal models; an excluding period setting unit 108 that sets periods to be excluded from the learned data on the basis of the anomaly measurements of the selected learned data; a threshold calculating unit 109 that calculates thresholds on the basis of the anomaly measurements of the selected learned data; and an anomaly detecting unit 110 that detects anomaly by comparing the anomaly measurements of each feature vector and the calculated thresholds. The input/output unit 130 is provided with a display frame 131.

The actions of this anomaly detection system 100 have two phases including one of "learning", in which learned data is generated and conserved by using accumulated data, and the other of "anomaly detection", in which anomaly is detected on the basis of input signals. Basically, the former is off-line processing and the latter, on-line processing, though it is possible to perform the latter off line. In the following description, the two are distinguished from each other as the learning phase and the anomaly detection phase.

The equipment 101 whose state is monitored by this anomaly detection system 100 includes equipment and plants, such as gas turbines and steam turbines. The equipment 101 outputs sensor signals 102 representing the state.

The sensor signals 102 are accumulated in the sensor signal storing unit 103. An example of list in which the sensor signals 102 are tabulated is shown in FIG. 2. The sensor signals 102 are multi-dimensional time series signals acquired at constant intervals of time, and their tabulated list comprises, as shown in FIG. 2, a day/hours column 201 and a column 202 of values of a plurality of sensors provided on the equipment 101. The variety of sensors may reach a few hundreds, or even a few thousands, of types. They may represent not only the temperatures of cylinders, oil and cooling water, pressures of oil and cooling water, the rotational speed of shafts, room temperature and durations of operation. The signals may not only represent outputs and states, but also be control signals to regulate something to certain values.

The flow of processing in the sensor signal analyzing unit 120 at the time of learning will now be described with reference to FIG. 3. In the learning phase, feature vectors are extracted by using data on a designated period out of the data accumulated in the sensor signal storing unit 103. The data extracted at this step will be referred to as learned data. Anomaly measurements of learned data except in excluding periods are calculated by cross validation. Periods to be excluded from learning are determined on the basis of the validation result to set thresholds of anomaly calculation, and this procedure is repeated. When any anomaly is detected, the learning-exclusion period and the anomaly determining threshold at the end of repetition are chosen.

First, the flow of processing in the feature vector extracting unit 104, the learned data selecting unit 105, the normal model generating unit 106, the anomaly measurement calculating unit 107, the excluding period setting unit 108 and the threshold calculating unit 109 will be described with reference to FIG. 3.

First in the feature vector extracting unit 104, sensor signals 102 in the period designated by the sensor signal storing unit 103 as a learning period are inputted (S301), after each individual sensor signal is made canonical (S302) a feature vectors are extracted (S303), and the feature vector is split into a plurality of periods, for instance one sect period ion per day (S304). Next, the excluding period setting unit 108 input parameters for determining excluding periods (S305). The parameters are the maximum number of repeats N, the maximum number of withholdings M and the effective decreasing width Δ. They are set in advance with a parameter file or GUI.

Next, the anomaly measurement calculating unit 107 calculates the anomaly measurements of all the feature vectors in the learning period, and the maximum anomaly measurement values in the learning period are extracted except in exclusion candidate periods set by the excluding period setting unit 108 (S306). In the first round, there is no exclusion candidate period. In the first round or when the decreasing width calculated from (the threshold set not later than the previous round–maximum anomaly measurement value) is greater than the parameter Δ (S307), the threshold calculating unit 109 sets the maximum anomaly measurement value as the threshold, and the excluding period setting unit 108 sets the exclusion candidate period as the learning exclusion period (S308).

If NO at step S307 (in the second or later round, or the decreasing width is not greater than the parameter Δ), the threshold succeeds its value until then. And the learning-exclusion period is also kept as it is. Then the decreasing width is checked (S309), and if it is negative, that is, a rise is found (YES at S309), the number of withholdings is counted up (S310). The initial value of the number of withholdings is obviously 0, though not shown. On the other hand, if the decreasing width is either positive or zero, namely a decline or the absence of variation is found (NO at S309), the number of withholdings is kept as it is.

After the processing at step S308, S309 or S310, the excluding period setting unit 108 adds the period of the maximum anomaly measurement value to the exclusion candidate period (S311). The number of repeats and the number of withholdings are checked (S312), and if the number of repeats is N or the number of withholdings is greater than the parameter M (YES at S312), the processing is ended to advance to S307. The learning exclusion period and the threshold at the time of end are kept on record as learned results.

The number of repeats here means how many times step S306 has been executed, and the number of withholdings means the number counted at step S310. If NO at step S312 (the number of repeats is less than N and the number of withholdings is not above the parameter M), the processing returns to step S306.

Next, each of the main steps will be described in detail.

At step S302, the feature vector extracting unit 104 makes each sensor signal canonical. For instance, using the average and the standard deviation of sensor signals in a designated period, it so performs conversion as to make the average 0 and the variance 1. So that the same conversion as at the time of anomaly detection, the average and the standard deviation of the sensor signals are stored in advance or, alternatively, conversion is so performed as to make the maximum 1 and the minimum 0 by using the maximum value and the minimum value of the sensor signals in a prescribed period. Instead, present upper limit and lower limit values may be used in place of the maximum value and the minimum value. To make possible the same conversion as at the time of anomaly detection, the maximum value and the minimum value of the sensor signals are stored in advance. The sensor signals are made canonical to enable sensor signals differing unit and scale to be handled at the same time.

At step S303, the feature vector extracting unit 104 extracts a feature vector at each time point. While it is conceivable to array as they are sensor signals made canonical, it is also conceivable to provide windows of +1, +2, . . . for a given time point and to extracts a feature representing variations of data over time with feature vectors of window width (3, 5, . . . )×the number of sensors. It is also conceivable to apply Discrete Wavelet Transform (DWT) to achieve decomposition into frequency components. Further at step S303, feature selection is carried out. At the minimum, the processing should exclude both of the sensor signals with very little variance and monotonously increasing sensor signals.

It is also conceivable to delete invalid signals by correlation analysis. This is a method by which, when correlation analysis of multi-dimensional time series signals reveal close similarity, for instance when a plurality of signals with correlation values close to 1 are found, duplicating signals are deleted as being redundant, out of the plurality of signals and non-duplicating signals are kept.

Alternatively, the user may designate the signals to be deleted. Another conceivable option is to remove features with wide long-term variations, because use of features with wide long-term variations would invite an increase in the number of normal states and accordingly a shortage of learned data. For instance, by calculating the average and variance of each cyclic period, the magnitude of long-term variations can be estimated according to their fluctuations.

Figure 4:
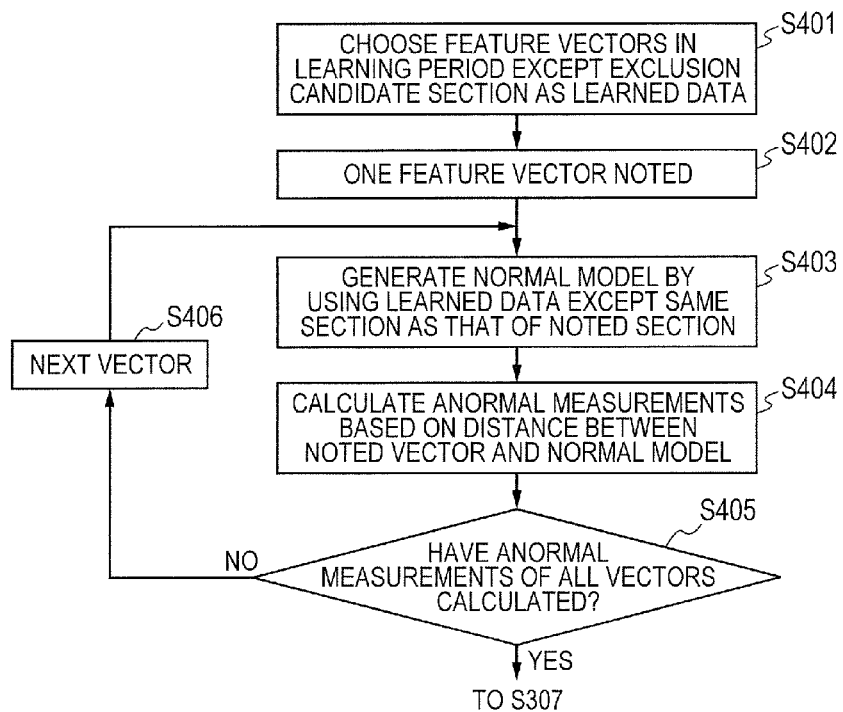
FIG. 4 is a flow chart of processing by the equipment state monitoring system, which is the first embodiment, when engaged in calculating anomaly measurements in learned data.

Details of processing at step S306 will be described with reference to FIG. 4. First by the learned data selecting unit 105, the results of excluding the feature vectors contained in the exclusion candidate period set by the excluding period setting unit 108 from the feature vectors extracted in the whole learning period is set as learned data (S401). Next, the first feature vector out of the feature vectors in the learning period is noted (S402), and in the normal model generating unit 106, using learned data cleared of the same period as that of the noted vector, generates a normal model (S403). The period here may be based on either the same splitting as the period at step S401 or an independently defined splitting. The anomaly measurement calculating unit 107 calculates anomaly measurements on the basis of the distance between the noted vector and the normal model (S404). If anomaly measurement calculation for all the vectors is completed (S405), processing at step S306 is ended to proceed to step S307. If anomaly measurement calculation for all the vectors is not completed at step S405, the next feature vector is noted (S406), and processing from steps S403 to S405 is repeated.

As a technique for normal model generation, the Local Sub-space Classifier (LSC) or the Projection Distance Method (PDM) is conceivable.

Figure 5:
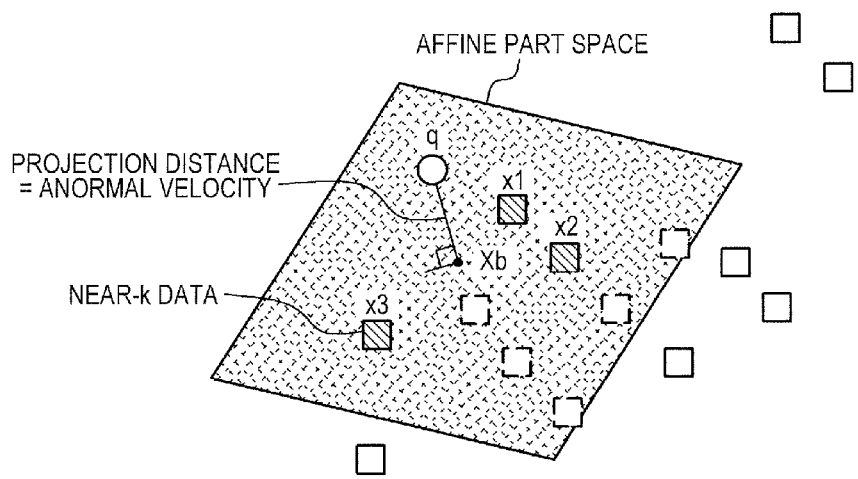
FIG. 5 illustrates an anomaly detection method based on a local subspace classifier.

By LSC, a k–1-dimensional affine part space is generated by using a near-k vector to the noted vector q. FIG. 5 shows a case in which k equals 3. As shown in FIG. 5, since anomaly measurements are represented by projection distances in the drawing, the point closest to the noted vector q in the affine part space can be figured out. From a matrix Q in which k q's are arrayed and a matrix X of xi, which can be calculated from evaluation data q and its near-k vector xi (i=1, . . . , k), a correlation matrix C is figured out from $$C = (Q-X)^T(Q-X) \qquad \text{Equation 1}$$

and b is calculated by $$b = \frac{C^{-1} 1_n}{1_n^T C^{-1} 1_n} \qquad \text{Equation 2}$$

where b is a coefficient vector expressing the weighting of xi.

The anomaly measurement d is represented by the next equation as it is the distance between q and Xb.

$$d = \|Xb - q\| \qquad \text{Equation 3}$$

Although k equals 3 in the case described with reference to FIG. 2, k may as well be any number if only it is sufficiently smaller than the number of dimensions of the feature vector. Where k equals 1, the processing is equivalent to the nearest neighbor algorithm.

PDM is a method of generating for selected feature vectors a part space having its own origin, that is, an affine part space (space with the greatest variance). A plurality of feature vectors matching the noted vector are selected in some way, and the affine part space is figured out in the following way. First, an average μ and a covariance matrix Σ of the selected feature vectors are figured out, then the eigenvalue problem of Σ is solved, and a matrix U in which eigenvectors matching pre-designated r eigenvalues are arrayed in the decreasing order of values is made the orthonormal basis of the affine part space. This r shall be smaller than the dimension number of the feature vectors and smaller than the number of selected data units. Alternatively it is also acceptable to give no fixed value to the r, which in this case shall be given the value at the time when the ratio of cumulative contributions in the decreasing order of eigenvalues has surpassed a pre-designated level. The anomaly measurements shall be the distance of projection of the noted vector on the affine part space. Here, one conceivable way to choose the plurality of feature vectors is to choose out of pre-designated tens to hundreds of feature vectors in the increasing order of distance to the noted vector. Another way is to cluster in advance the feature vectors to be learned and to choose feature vectors included in the closest cluster to the noted vector.

Still other conceivable ways include the local average distance method that uses the distances of the noted vector q to the average vector of near-k vectors as anomaly measurements and the Gaussian process.

Regarding step S308, it is stated that the threshold calculating unit 109 sets the maximum anomaly measurement value as the threshold. Now, an example of modification to use another threshold calculating method will be described. Other ways of setting the threshold than that of using the maximum anomaly measurement value include sorting of anomaly measurements in all the feature vectors in the learning period except for the exclusion candidate periods in the ascending order and setting a value reaching close to 1 which is a pre-designated ratio as the threshold. The threshold can also be calculated by such processing as offsetting the above value reaching close to 1 or multiplying it by a constant number. In this case, the maximum anomaly measurement value is set as a first threshold and the threshold calculated by the above-described procedure as a second threshold; the first threshold is used for comparison at step S307, both the first threshold and the second threshold are updated at step S308 and, after the end of processing (S313), the second threshold is recorded as the anomaly determining threshold.

By sequentially excluding the period of the maximum anomaly measurement from learning, and determining the learning exclusion period in accordance with preset parameters and stopping the repetition as described above, it makes possible to find an appropriate excluding period, set an appropriate threshold and realize a high-sensitivity detection of any anomaly. The exclusion is sequentially done because anomaly measurements of feature vectors vary by the change of learned data.

The decreasing width at S307 is an indication to evaluate the validity of the excluded periods. A large decreasing width indicates that the data of the excluded periods is far away from the learned data in other periods and accordingly is seldom used for learning. That is, it is very likely to be anomaly and accordingly should be excluded. If it is small, its exclusion would not bring down the threshold significantly and a correspondingly smaller advantage, and makes the determination of the presence or absence of anomaly difficult, accordingly necessitating no exclusion. A negative decreasing width means that its exclusion would result in a higher threshold, and indicating that data in excluded periods has been used for learning of data in other periods. Where similar anomalies which should not be excluded theoretically are found in two periods, exclusion of the anomalies from one period would invites a rise in anomaly measurement in the other period. Therefore, a concept of withholding has been introduced. By setting the maximum number of withholdings M, it is made possible to exclude en bloc such paired anomaly periods up to M pairs.

In the flow charted in FIG. 3, one exclusion candidate period is added at a time, but more than one may as well be added. In that case, the maximum anomaly measurement value is calculated for each individual period at step S306. Further at step S311, every period in which the maximum anomaly measurement value of each individual period is greater than (threshold−Δ) is made an exclusion candidate period.

Figure 6:
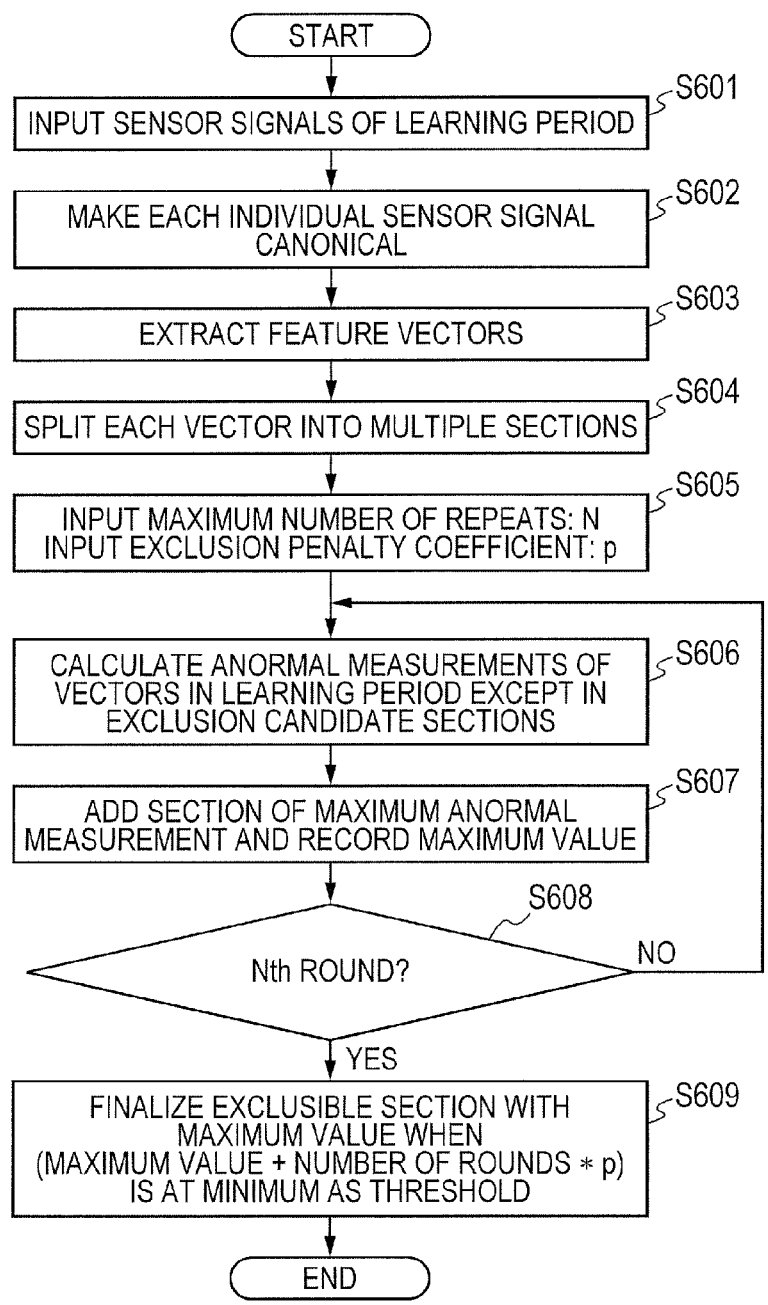
FIG. 6 is a flow chart of processing by the equipment state monitoring system, which is the first embodiment, when engaged in another case.

Another embodiment of processing flow at the time of learning different from that described with reference to FIG. 3 will be described with reference to FIG. 6. First, the feature vector extracting unit 104 inputs the sensor signals 102 of the period designated as the learning period by the sensor signal storing unit 103 (S601), makes each individual sensor signal canonical (S602), extracts a feature vector (S603) and splits the feature vectors into a plurality of periods, such as one period for each day (S604). The processing up to this point is the same as steps from S301 to S304 described with reference to FIG. 3.

Next, parameters for determining excluding periods are inputted (S605). The parameters are the maximum number of repeats N and an exclusion penalty coefficient p. They are set in advance in a parameter file or the GUI. Next, anomaly measurement calculation of vectors in the learning period is executed (S606). In the first round, there is no exclusion candidate period. The excluding period setting unit 108 adds the maximum anomaly measurement value periods except exclusion candidate period to the exclusion candidate periods (S607). Then, the number of repeats is checked (S608). When the number of repeats is N (YES at S608), the maximum anomaly measurement value in case (the maximum anomaly measurement value+the number of repeats*p) is at its minimum being set as the threshold, and the exclusion candidate period exceeding the threshold is determined as a learning exclusion period (S609), then end the processing. The learning-exclusion period and the threshold are kept on record as learned results. If the number of repeats is less than N at step S608 (NO at S608), the process returns to step S606.

By sequentially excluding the period of the maximum anomaly measurement from learning a pre-determined number of time, and determining the learning exclusion period in accordance with parameters preset on the basis of the result of each round of exclusion and the threshold as described above, it makes possible to find an appropriate excluding period, set an appropriate threshold and realize a high-sensitivity detection of any anomaly. The exclusion penalty coefficient p has an action similar to that of the effective decreasing width Δ in FIG. 3. Where p is 0, the learning period exclusion period is so determined as to set the threshold at its minimum. Making p greater than 0, exclusion of periods where determination of normal or anomaly is delicate is restrained.

The flow of process at the time of anomaly detection will now be described with reference to FIG. 7. When any anomaly is to be detected, anomaly measurements of data during a designated period out of data accumulated in the sensor signal storing unit 103 or newly found data are calculated to determine normal or anomaly.

Figure 7:
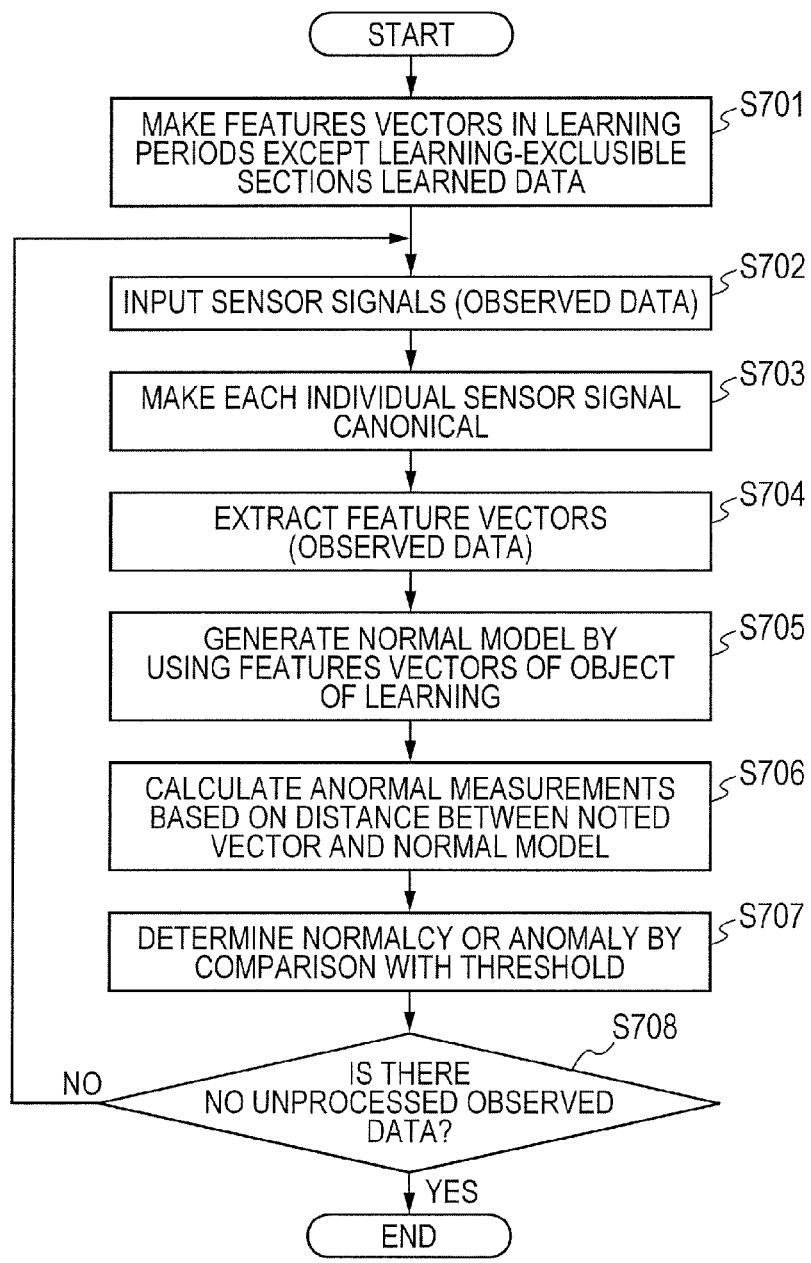
FIG. 7 is a flow chart of processing by the equipment state monitoring system, which is the first embodiment, when engaged in anomaly detection.

FIG. 7 charts the flow of processing by the feature vector extracting unit 104, the learned data selecting unit 105, the normal model generating unit 106, the anomaly measurement calculating unit 107 and the anomaly detecting unit 110 to detect any anomaly. First, the learned data selecting unit 105 chooses feature vectors during the learning period except learning exclusion period as the feature vector to be learned (S701). These feature vectors will hereinafter be simply referred to as learned data. Next, the feature vector extracting unit 104 inputs sensor signals 102 from the sensor signal storing unit 103 or the equipment 101 (S702) and, after making each individual sensor signal canonical (S703), extracts feature vectors (S704).

For making sensor signals canonical, the same parameters as those used for making learned data canonical in the processing at step S302 in FIG. 3 are used. Extraction of feature vectors is accomplished in the same as the processing at step S303. Therefore, if feature selection is executed at step S303, the same features are chosen. The feature vectors extracted here shall be referred to as observed vectors to distinguish them from learned data.

Next, the normal model generating unit 106 generates a normal model from learned data (S705), and the anomaly measurement calculating unit 107 calculates anomaly measurements on the basis of distances between the normal model and the observed vectors (S706). The method of generating the normal model shall be the same as that used in learning. The anomaly detecting unit 110 compares the threshold calculated at the time of learning with anomaly measurements, and determines each anomaly measurement as being anomaly if it is greater than the threshold or, if not, as normal (S707). Next, it is checked whether or not there is any unprocessed observed data (S708) and, if there is no unprocessed observed data (NO at S708), the processing is ended. And if there remains any unprocessed observed data (YES at S708), processing from steps S702 to S707 is repeated as long as there is any data to be processed.

An embodiment of GUI to be displayed on a display part 131 of the input/output unit 130 of the anomaly detection system 100 to realize the method described above will be described.

Figure 8:
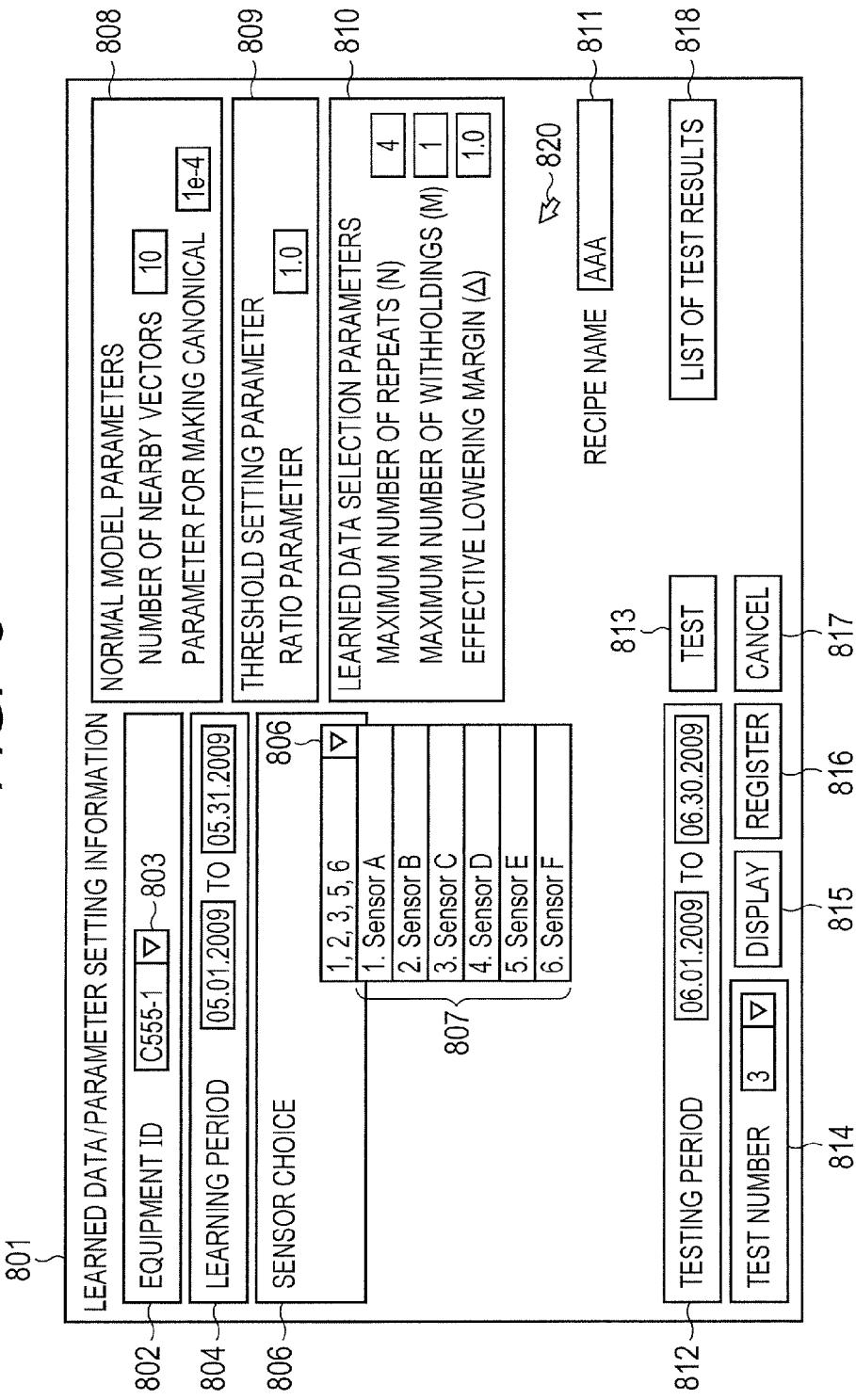
FIG. 8 is a front view of a display frame showing one example of GUI for recipe setting in the equipment state monitoring system, which is the first embodiment.

An example of GUI for setting the learning period and processing parameters is shown in FIG. 8. In the following description, this setting procedure will be referred to simply as recipe setting. Further, the past sensor signals 102 are supposed to be stored, associated with equipment IDs and time points, in a database. In a recipe setting frame 801 displayed on the display part 131, object equipment items, learning periods, sensors used, reference calculating parameters and threshold setting parameters are inputted.

In an equipment ID input window 802, IDs of equipment items to be monitored are inputted. As pressing down an equipment list display button 803 results in displaying of a list of equipment IDs in the data stored in a database, though not shown, inputting is done selectively from the list. Into a learning period input window 804, the start and end days of the period in which extraction of learned data is desired are inputted. Into a sensor selecting window 805, the sensors to be used are inputted.

As clicking of a list displaying button 806 causes a sensor list 807 to be displayed, selective inputting is done by moving a cursor 820 to the name of the desired sensor in the list and clicking it. Multiple selection is also possible. Into a normal model parameter input window 808, parameters for use in normal model generation are inputted.

The drawing shows a case in which a local subspace classifier is used, where the number of the neighbor vectors and a normalized parameter are inputted. The normalized parameter is a small number to be added to a diagonal component to prevent an inverse matrix to the correlation matrix C from being obtained by Equation 2. To a threshold parameter input window 809, parameters for use in the processing of threshold setting are inputted. The drawing shows a case of ratios to be applied to a cumulative histogram. A real number not smaller than 0 but not greater than 1 is inputted here. Where it is 1, the maximum anomaly measurement value is set as the threshold at step S308. Where it is less than 1, anomaly measurements in all the feature vectors in the learning period except exclusion candidate periods are sorted in the ascending order and a value reaching a pre-designated ratio is set 1 as the second threshold as described as an example of modification, and after the end of repetition the second threshold is adopted as the anomaly determining threshold.

Into a recipe name input window 811, a unique name to be associated with inputted information is inputted. When all information has been inputted, a test period is inputted to a test period input window 1311. This space may be left blank. In that case, only learning is done. After inputting the foregoing information, the recipe is tested by pressing down a test button 813.

By this operation, the serial numbers of tests executed under the same recipe name are numbered. Equipment ID information, sensors-in-use information, the learning period, parameters used for feature vector and the normal model parameters are kept in store, associated with the recipe name and the serialized test number.

Next, learning is executed following the processing flow charted in FIG. 3. In making the data canonical at step S302, an average and a standard deviation are figured out by using all the sensor signals in the designated learning period. The values of these average and standard deviation are kept in store, associated with the recipe name and the test number on a sensor-by-sensor basis. Sensor period splitting at step S304 are kept in store, with each split number associated with the date on, for instance, a daily basis.

Processing from steps S306 to S311 is repeated until the ending requirements are met at step S312. In repeating the processing, the rounds are assigned processing numbers beginning with 1. The exclusion candidate period number at step S306, the calculated anomaly measurements and the maximum anomaly measurement value in all the learning periods, the threshold and the learning exclusion period determined at step S308 or succeeded from the preceding round and the number of withholdings at that time point are kept in store together with processing numbers. Further, though not shown in FIG. 3, anomaly determination is done for all the learning periods with the maximum anomaly measurement value calculated at step S306 being used as the threshold for the display purpose, and the results are kept in store. Also, the processing number of the time when the threshold and the learning exclusion period at the time of the end of repetition is also kept in store.

Then, by using the sensor signals 102 during the testing period and associated with the processing number at the time of learning, anomaly detection shown in FIG. 7 is processed, and the anomaly measurements and the determination results are kept in stored together with the processing number. The learning exclusion period at step S701 in each round shall be the exclusion candidate period used at step S306 of the corresponding processing number at the time of learning. The threshold at step S707 shall be the maximum anomaly measurement value calculated at step S306 of the corresponding processing number at the time of learning.

Figure 9C:
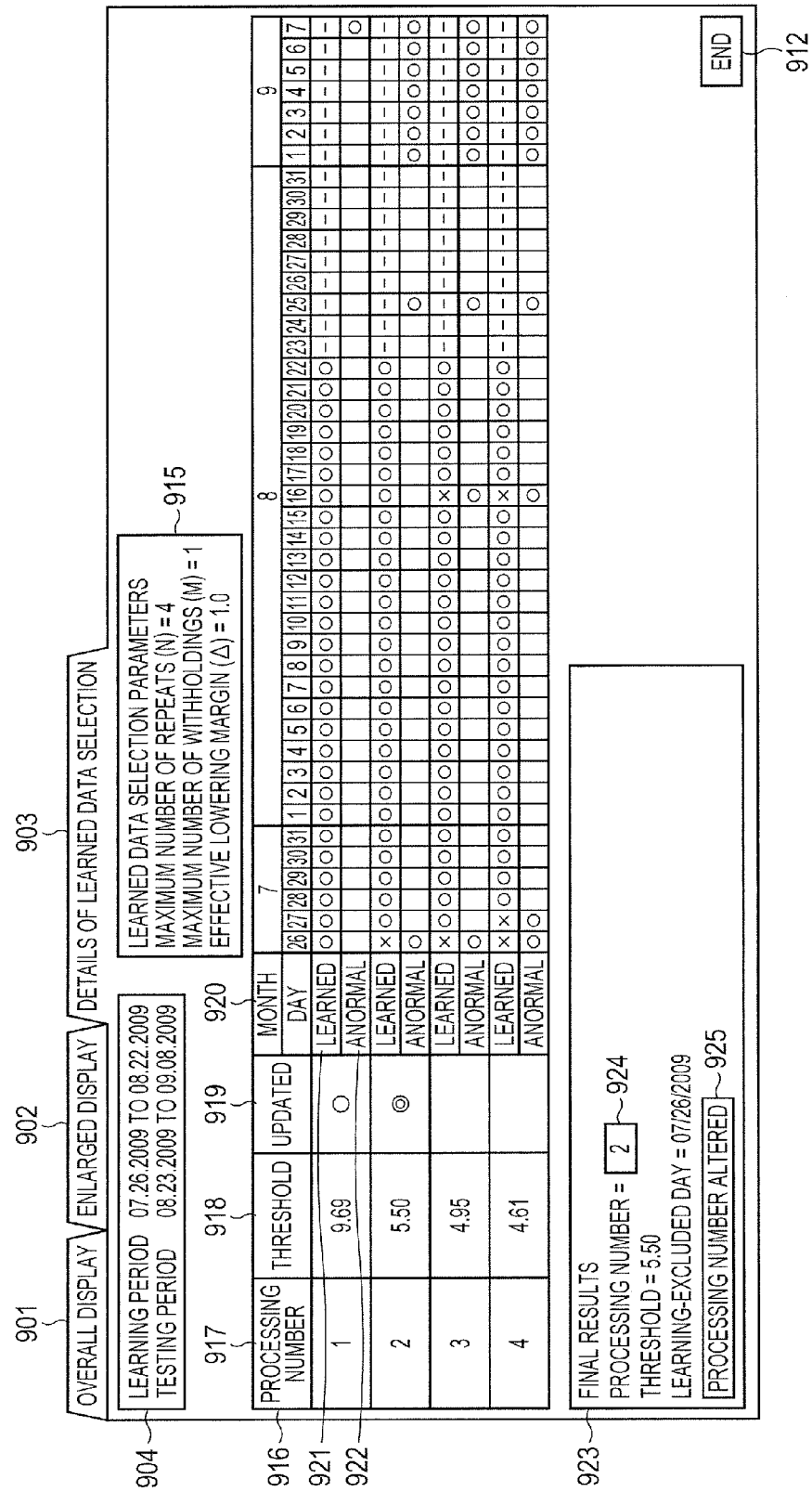
FIG. 9C is a front view of a display frame showing details of learned data selection in an example of result displaying frame in the equipment state monitoring system, which is the first embodiment.

After the end of recipe testing, the test results are shown to the user. Examples of GUI for that purpose are shown in FIG. 9A, FIG. 9B and FIG. 9C. By choosing a desired one of tabs displayed at the top of each frame, switch-over can be accomplished among a result display frame 901, an enlarged result display frame 902 and a details of learned data selection display frame 903 can be accomplished.

FIG. 9A shows the result display frame 901 displayed on the display part 131. The result display frame 901 gives an overall display including anomaly measurements, thresholds, determination results and a time-series graph of sensor signals over the whole designated period. In a period display window 904, a designated learning period and testing period are displayed. In a processing number display window 905, the processing number of the data being displayed is shown. At first, the threshold at the time of repetition end and the processing number of determination of learning exclusion periods are supposed to be displayed. In an anomaly measurement display window 906, the processing number of the anomaly measurement, threshold and determination result in the designated learning period and testing period are displayed. Further, the periods used for learning are marked with circles above. In a sensor signal display window 907, the output level of a designated sensor in a designated period is displayed. Sensor designation is accomplished by inputting into a sensor name selection window 908. It has to be noted, however, that the leading sensor is chosen before designation by the user. A cursor 909 represents the start point of enlarged displaying, and can be shifted by mouse manipulation. A number of displaying days designation window 910 displays the number of days from the start point to the end point of enlarged displaying on the enlarged result display frame 902, though not used in this frame. It can as well be inputted in this frame. A date display window 911 displays the dates of cursor positions. By pressing down an ending button 912, all of the result display frame 901, the enlarged result display frame 902, and the details of learned data selection display frame 903 can be deleted to end the processing.

FIG. 9B shows the enlarged result display frame 902. The enlarged result display frame 902 displays anomaly measurements, thresholds and determination results for a designated number of days beginning with a date indicated by the cursor 909 in the result display frame 901 and a time-series graph of sensor signals. In the period display window 904, the same information as in the result display frame 901 is displayed. In the anomaly measurement display window 906 and the sensor signal display window 907, similar information to that in the result display frame 901 is displayed in an enlarged size. In the number of displaying days designation window 910, the number of days from the start point to the end point of enlarged displaying is designated. In the date display window 911, the date of the start point of enlarged displaying is displayed. It is also possible to alter the start point of displaying with a scroll bar 913, and this alteration is reflected in the position of the cursor 909 and the display in the date display window 911. The overall length of a scroll bar display area 914 corresponds to the whole period displayed in the result display frame 901. Further, the length of the scroll bar display area 914 corresponds to the number of days designated in the number of displaying days designation window 910, and the left end of the scroll bar 913 corresponds to the start point of enlarged displaying. Pressing down the ending button 912 ends the processing.

FIG. 9C shows an example of the details of learned data selection display frame 903 displayed in the display part 131. In the details of learned data selection display frame 903, the threshold, learning exclusion period and anomaly detection results in each period are displayed, classified by the processing number. In the period display window 904, the designated learning period and testing period are displayed. In a parameter display window 915, parameters for learned data selection are displayed.

A learned data selection details display window 916 comprises a processing number column 917, a threshold column 918, an update check column 919, a period display column 920, a learning period check column 921 and an anomaly detecting period check column 922. In the processing number column 917, the processing number is displayed, and in the threshold column 918, the maximum anomaly measurement value is displayed. The update check column 919 is marked with a circle when processing at step S308 of FIG. 3 is done on each of the processing numbers. The final round of repetition is marked with a double circle. In the period display column 920, information expressing period is displayed. In this case, the information is the month and the day. If it fits the way of splitting the period, the hours may be displayed, or simply the period number may be displayed. In the learning period check column 921, the processing number to which there is a corresponding period is marked with an x mark for an exclusion candidate period of a learning period and a circle for any other case, or with a hyphen for a testing period. In the anomaly detecting period check column 922, the processing number to which there is a corresponding period is marked with a circle if anomaly is detected at least once. The column is left blank if no anomaly is detected at all.

In a final result display window 923, the threshold finalized after the end of repeated processing, the learning exclusion period, and the processing number at the time of finalization, that is, the processing number marked with a double circle in its update check column 919, are displayed. While what are displayed here are learned results, if it is desired to store the result of a different processing number as learned results, the contents displayed in the final result display window 923 can be replaced by information corresponding to the inputted processing number by inputting a number into a processing number input window 924 and pressing down a processing number altering button 925. Also, the inputted processing number is stored as a learned result. Pressing down the ending button 912 ends the processing.

When confirmation of anomaly detection results and learned data selection results is ended by pressing down the ending button 912 in any of the frames shown in FIGS. 9A to 9C, the display returns to the recipe setting frame 801 shown in FIG. 8. In a test number display window 814, numbers assigned in the foregoing test are displayed. If there is any problem with the confirmed contents, the learning period, the chosen sensor and/or the parameters are altered, and retesting is done by pressing down the test button 813. Or it is also possible to recheck the results of a test already made. The test number is selectively inputted from the test number display window 814, and a display button 815 is pressed down. This operation causes information stored in association with a recipe name and a test number to be loaded and displayed in the result display frame 901. It is also possible to cause the enlarged result display frame 902 or the details of learned data selection display frame 903 to be displayed by switching over the tab. After confirmation, the ending button 912 is pressed down to return to displaying of the recipe setting frame 801.

By shifting the cursor 820 onto a registration button 816 and pressing down (clicking) the registration button 816 in the recipe frame 801, information stored in association with the recipe name and the test number displayed in the test number display window 814 is registered in association with the recipe name to end the processing. When a cancellation button 817 is pressed, the processing is ended without storing anything.

When a test result list button 818 is pressed down, a test result list display screen 1001 shown in FIG. 10 is displayed. In a test result list 1002, recipe information including the learning period, testing period, chosen sensor number, normal model generation parameters, threshold setting parameters and learned data selection parameters for all the tests together with learning and test result information including thresholds, learning exclusion periods, and the number of anomaly periods are displayed. At the left end of the list, there is a choice check button to permit choice of any one only. By pressing down a detailed display button 1003, information stored in association with the recipe name and the test number is loaded, and the result display frame 901 is displayed. It is also possible to cause the enlarged result display frame 902 or the details of learned data selection display frame 903 to be displayed by switching over the tab.

Completion of confirmation is followed by pressing down the ending button 912 to return to displaying of the test result list display screen 1001. By pressing down a register button 1004, information stored in association with the test number being chosen is registered in association with the recipe name to end displaying of the test result list display screen 1001 and of the recipe setting frame 801. When a back button 1005 is pressed down, no recipe is registered, and displaying of the recipe setting frame 801 is returned to.

Any registered recipe is managed, with a label indicating whether it is active or inactive, and newly observed data undergoes processing from feature vector extraction to anomaly detection described with reference to FIG. 7 by using information on an active recipe whose equipment ID matches, and the result is kept in store in association with the recipe name.

An example of GUI that displays the results of anomaly detection processing described above on the display frame 131 is shown in FIG. 11. FIG. 11 shows an example of GUI that designates the object of display. The equipment to be displayed, recipe and period are designated from a display object designating frame 1101. First, an equipment ID chosen from an equipment ID choice window 1102. Next, a recipe to be displayed is chosen from a list of recipes for the equipment ID from a recipe name choice window 1103. A data registering period display unit 1104 displays the start day and the end day of a period that is processed by using the inputted recipe and in which records are preserved. To a result displaying period designating window 1105, the start day and the end day of a period in which displaying of the results is desired. To a displayable sensor designation window 1106, the name of the sensor whose displaying is desired is inputted. By pressing down a display button 1107, the result display frame 901 shown in FIG. 9A is displayed. Pressing down the ending button 912 ends the processing.

Since the screens and operations of the GUI pertaining to result displaying are substantially the same as those of the GUI pertaining to test result displaying shown in FIG. 9A and FIG. 9B, only the differing parts will be described below. In the period display window 904 of the result display frame 901 and the enlarged result display frame 902, a display period 1201 designated by the result displaying period designating window 1105 is displayed as shown in FIG. 12. In the result display frame 901, anomaly measurements, thresholds and determination results in the designated displaying period are displayed in the anomaly measurement display window 906. Further, periods used for learning are marked with circles 9061. In the sensor signal display window 907, the output values of sensors designated by the display sensor designation window 1106 for a designated period are displayed. The sensor to be displayed can be altered by a corresponding input to the sensor name selection window 908. When results regarding newly observed data are to be displayed, the details of learned data selection display frame 903 is not displayed.

As it is possible to set an exclusion period to set an anomaly model for anomaly detection while visually checking sensor signal, extracted features, anomaly measurements and thresholds on the GUI described above, it has become possible to generate a better normal model by using data containing no anomaly.

While the foregoing embodiment is supposed to accomplish setting of learned data off line, anomaly direction process on a real time basis and result displaying off line, real time result displaying is also possible. In that case, the conceivable configuration is such that the length of the display period, the recipe to be displayed and the information to be displayed are prescribed in advance, and latest information is displayed at regular intervals of time.

Conversely, it is also conceivable to add functions to set any desired period, choose a recipe and process anomaly detection off line, and this configuration also falls under the scope of the present invention.

Second Embodiment

This anomaly detection system 100 is provided with a sensor signal analyzing unit 120 and an input/output unit 130.

Figure 13A:
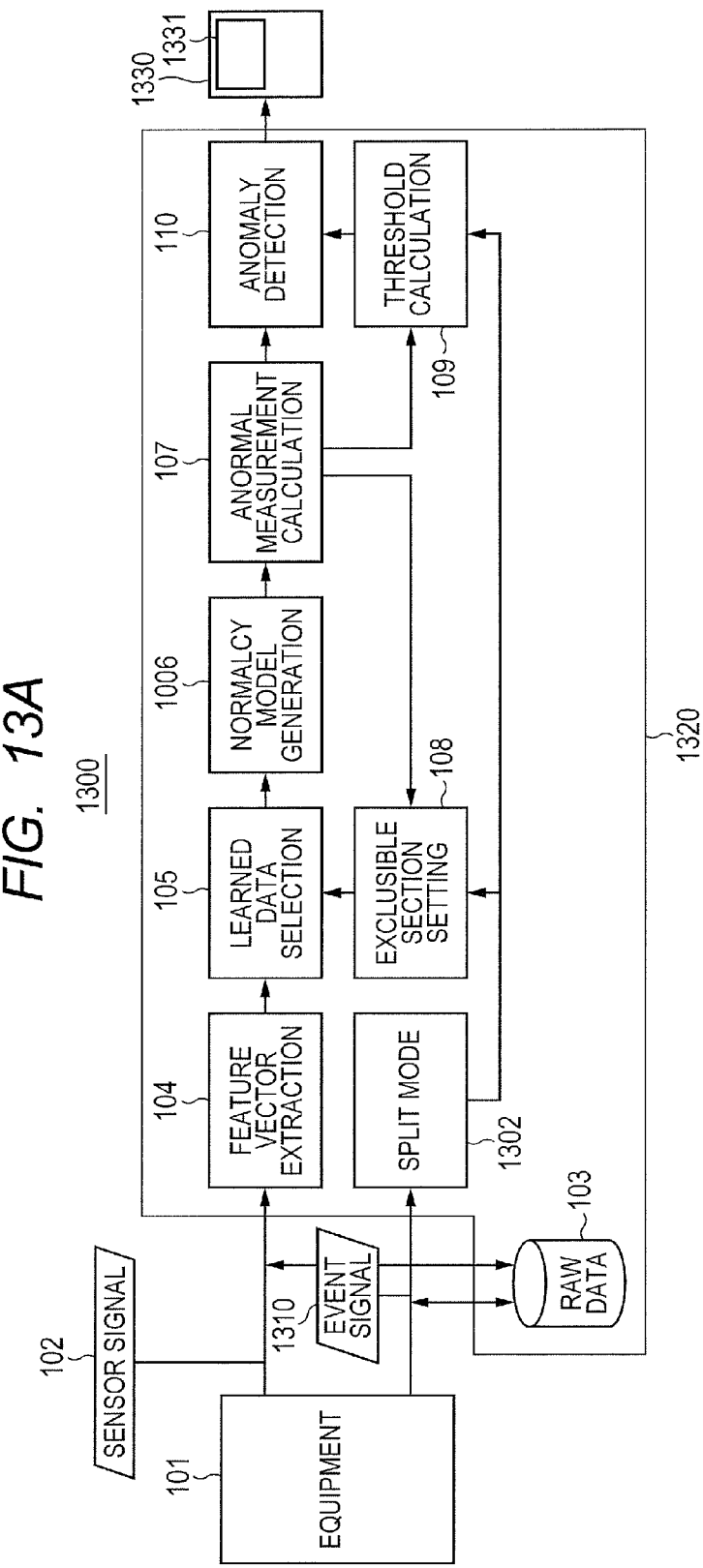
FIG. 13A is a block diagram outlining the configuration of an equipment state monitoring system, which is a second embodiment of the invention.

While a first embodiment was described with respect to a method of anomaly detection on the basis of sensor signals outputted from equipment, another embodiment to be described now uses a method of anomaly detection that also utilizes event signals outputted from equipment. FIG. 13A shows the configuration of an anomaly detection system 1300 that implements the anomaly detection method of this embodiment. The anomaly detection system 1300 is provided with a sensor signal analyzing unit 1320 and an input/output unit 1330. In the anomaly detection system 1300 in this embodiment, the anomaly detection system 100 of the first embodiment shown in FIG. 1 has a configuration including a mode splitting unit 1302 added to the sensor signal analyzing unit 120. Constituent elements assigned the same reference numbers as in the configuration illustrated by FIG. 1 have respectively the same mechanisms as those described with regard to the first embodiment, and accordingly their description will be dispensed with.

To the mode splitting unit 1302, an event signal 1301 is inputted from the equipment 101, and splitting into modes representing the operating states of the equipment 101 on the basis of the signal. The result of splitting into modes is inputted to the exclusion period setting unit 108 and the threshold calculating unit 109 and undergoes the same processing as what was described with reference to FIG. 3, and a threshold is set for each individual mode. For setting of exclusion periods, a pre-designated mode alone is noted and undergoes processing from steps S306 to S311, though the maximum anomaly measurement values are recorded every time separately for each mode. Further, anomaly determination by the anomaly detecting unit 110 at step S707 is done by using a threshold of the corresponding mode.

It is also conceivable to set excluding periods on a mode-by-mode basis. In that case, learning exclusion periods are determined one at a time on the basis of anomaly measurements in only a noted mode out of all the modes. Parts in the corresponding mode of the exclusion periods determined in this way are excluded from the learned data.

Figure 13B:
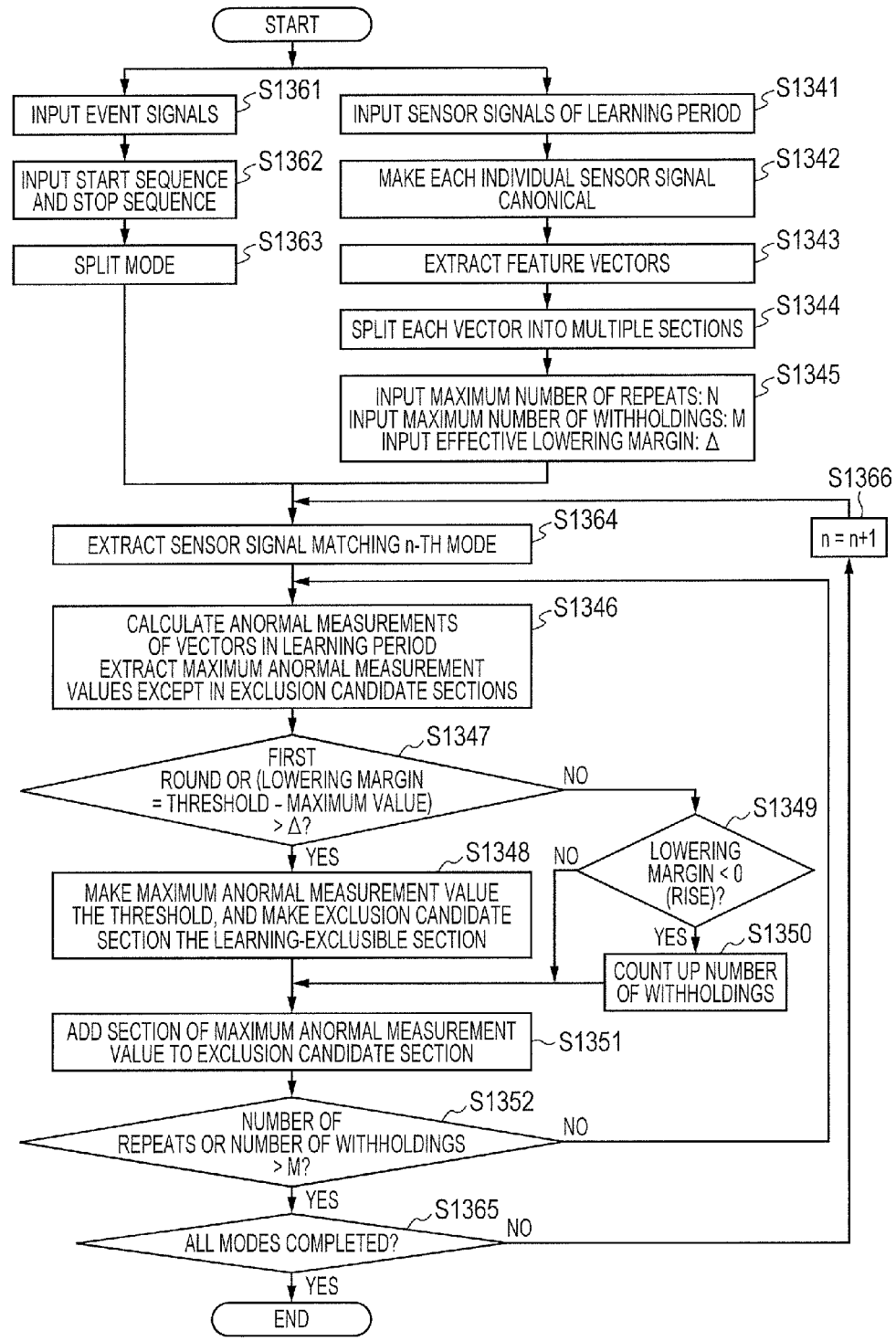
FIG. 13B is a flow chart of processing by the equipment state monitoring system, which is the second embodiment, when engaged in learning.

Next, the flow of processing to determine learning exclusion periods one at a time on the basis of anomaly measurements in only the noted mode will be described with reference to FIG. 13B.

First, the feature vector extracting unit 104 inputs from the sensor signal storing unit 103 the sensor signals 102 of a period designated as a learning period (S1341), after making each individual sensor signal canonical (S1342), feature vectors are extracted (S1343) and split into a plurality of periods, for instance one period for each day (S1344). Next, the exclusion period setting unit 108 inputs parameters for determining exclusion periods (S1345). The parameters are the maximum number of repeats N, the maximum number of withholdings M and an effective decreasing width Δ. They are set in advance by a parameter file of GUI.

Figures 14A, 14B, 15:
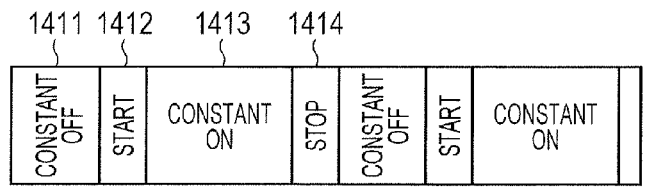
FIG. 14A is a list tabulating examples of event signals in the equipment state monitoring system, which is the second embodiment.
FIG. 14B schematically shows an event signal classified into one of another of four modes into which the operating state of equipment of the equipment state monitoring system, which is the second embodiment, is split.
FIG. 15 is a list tabulating conditions in exclusion from learning in an equipment state monitoring system, which is a third embodiment of the invention.

On the other hand, the event signal 1301 outputted from the equipment 101 is inputted to the mode splitting unit 1302 (S1361), and an event signal, which is a non-periodically outputted signal representing the operation start, operation stop, trouble or warning, is retrieved by searching prescribed character strings or codes as shown in FIG. 14A, and a start sequence and a stop sequence are cut out (S1402). On the basis of the results of these actions, splitting is accomplished into four operating states including a "constant OFF" mode 1411 as shown in FIG. 14B from the end time point of the stop sequence to the start time point of the start sequence, a "start" mode 1412 in the start sequence, a "constant ON" mode 1413 from the end time point of the start sequence to the start time point of the stop sequence and a "stop" mode 1414 in the stop sequence (S1363).

Next, out of the feature vectors split into a plurality of periods at S1344, feature vectors matching the n-th of the modes into which splitting was done at S1363 are extracted (S1364), and the anomaly measurement calculating unit 107 calculates the anomaly measurements of the feature vectors matching the n-th mode to figure out the maximum anomaly measurement value except in the exclusion candidate periods set by the exclusion period setting unit 108 (S1346). At first, there is no exclusion candidate period. In this first round or if the decreasing width calculated by (the threshold set in or before the preceding round–the maximum anomaly measurement value) is greater than the parameter Δ (S1347), the threshold calculating unit 109 sets the maximum anomaly measurement value as the threshold, and the exclusion period setting unit 108 sets exclusion candidate periods as learning exclusion periods (S1348).

If NO at step S1347 (in the second or later round or if the decreasing width is not greater than the parameter Δ), the threshold succeeds the value until then. Also, the learning exclusion periods are kept as they are. Then, the decreasing width is checked (S1349) and, if the decreasing width is negative, that is, rising (YES at S1349), the number of withholdings is counted up (S1350). The initial value of the number of withholdings, though not shown, is of course 0. On the other hand, if the decreasing width is positive or zero, namely falling or does not vary (NO at S1349), the number of withholdings is kept as it is.

After the processing at step S1348, S1349 or S1350, the period exclusion period setting unit 108 adds the period of the maximum anomaly measurement value to the exclusion candidate periods (S1351). The number of repeats and the number of withholdings are checked (S1352) and, if the number of repeats is N or the number of withholdings is greater than the parameter M (YES at S1352), it is checked whether or not all the modes into which splitting was done at S1363 have been processed (S1365). If YES, the processing is ended, and learning exclusion period and the thresholds at the time of end are kept on record as learned results. Here the number of repeats means how many times execution was done at step S1346, while the number of withholdings means the number counted at step S1350.

If NO at step S1352 (the number of repeats is less than N and the number of withholdings is not greater than the parameter M), the processing returns to step S1346.

Alternatively if NO at step S1365 (setting of exclusion period has not been completed for all the modes), n is counted up by 1 (S1366), and processing from steps S1364 to S1351 is executed on sensor signals in the new mode.

An embodiment of a mode splitting method based on event signals, which constitute a different part from the processing described with reference to the first embodiment will now be described with reference to FIGS. 14A and 14B. Examples of event signal are shown in FIG. 14A. They are non-periodically outputted signals representing the operation start, operation stop, trouble or warning, and comprise a character string or codes representing time points, and operation, trouble or warning. FIG. 14B shows a case of splitting into the four operating states including the "constant OFF" mode 1411 from the end time point of the stop sequence to the start time point of the start sequence, the "start" mode 1412 in the start sequence, the "constant ON" mode 1413 from the end time point of the start sequence to the start time point of the stop sequence and the "stop" mode 1414.

In order to cut out a sequence, the start event and the end event of the sequence are designated in advance, the cutting-out is accomplished while scanning the event signal from the leading edge to the trailing edge in the following way.

(1) If not on the way of the sequence, the start event is searched for. If the start event is found, it is used as the start of the sequence.

(2) If on the way of the sequence, the end event is searched for. If the end event is found, it is used as the end of the sequence. The end event here may mean not only a designated end event but also a designated start event for trouble or warning.

As hitherto described, the use of event signals makes possible accurate splitting of diverse operating states and, by setting different thresholds for different modes, high-sensitivity anomaly detection can be accomplished in the "constant OFF" mode 1411 and the "constant ON" mode 1413 even if the sensitivity has to be somewhat sacrificed in the transitional phase of the "start" mode 1412 and the "stop" mode 1414 on account of the shortage of learned data.

Third Embodiment

While learning exclusion periods are determined on the basis of the results of anomaly measurement calculation in the first and second embodiments, in this embodiment user-designated periods of periods satisfying user-designated conditions are initially set as learning exclusion periods. A step to set learning exclusion period is inserted before step S305 at the time of learning described with reference to FIG. 3 or step S605 in FIG. 6 in the first embodiment.

A method of designating periods by the user may use a dedicated GUI or file inputting. For instance, a numerical value such as "20090726" representing the year, month and day is written in advance on one line. This means Jul. 26, 2009. Of course, designation may as well be done with a period number.

Examples of user designation of conditions are described below.

A first example is processing to set learning exclusion period by using event signals. Basically, it is determined on the basis of event signal whether or not a given period contains an anomaly state. Conditions to determine an anomaly state include the following, for instance. (1) Occurrence of an event or trouble or warning; (2) presence of an anomaly start sequence; (3) the number of start sequences is beyond a prescribed extent; (4) the time elapsed from an end sequence to a start sequence is beyond a prescribed extent; and (5) occurrence of an event of a low frequency. Condition setting for cases (1), (3) and (5) can be made according to event numbers and permissible frequencies. Case (1) can be addressed by designating events matching trouble or warning, while case (5) can be coped with by studying the frequencies of different events and designating low-frequency events. A period involving at least one such designated event is supposed to be anomaly. Against case (3), the start event for the start sequence can be designated, together with the number of such events permissible for a single period. Condition setting for case (2) may be made by designating three event numbers, that is, a combination of the start event for the start sequence, the end event for the start sequence and anomaly end events. The anomaly end events include an actuation start event and a stopping start event. If there is any anomaly end event between the start event of the start sequence and the end event of the start sequence, the period involving the anomaly end event is supposed to be anomaly. Condition setting for case (4) is done by designating two event numbers and according to time intervals between events. The start event of the stop sequence and the start event of the start sequence are designated and, if the time interval between these events is beyond the prescribed extent, the period containing the start event of the start sequence is deemed to be anomaly.

A second example is a process for setting a learning exclusion period by utilizing sensor signals. Periods each including a time which satisfies conditions for pre-designated sensor signals are supposed to be exclusion periods. FIG. 15 shows an example of file stating such conditions. The statements of conditions include a sensor name 1501, a code 1502 and a threshold 1503. The codes comprise "=", "<", "<=", ">=", ">" and "< >", respectively meaning equals, less than, not more than, not less than, more than and different from. In the case of this drawing, anomaly is determined if "Sensor A" is less than −100 and "Sensor D" is not less than 500, and periods involving any such anomaly state are excluded.

What is claimed is:

1. A method of detecting anomaly in a facility or an apparatus by using multi-dimensional time series sensor signals outputted from sensors attached to the facility or apparatus during operation, comprising:

a first step of extracting feature vectors from sensor signals in a pre-designated learning period out of the multi-dimensional time series sensor signals as observed vectors;

a second step of extracting learning data, in which feature vectors in the exclusion candidate period are excluded from feature vectors of the pre-designated learning period;

a third step of calculating anomaly measurements of the learning data;

a fourth step of extracting a maximum value of the anomaly measurements during the learning period except the exclusion candidate period, and in response to determining that the maximum value of the anomaly measurements meets a predetermined renewal condition, set the maximum value of the anomaly measurements as a threshold for anomaly determination, and set the exclusion candidate period as the learning exclusive period;

a fifth step of adding a period the maximum value of the anomaly measurements to the exclusion candidate period;

a sixth step of determining whether a predetermined ending condition is met and upon determining that the predetermined ending condition is not met, performing the second step, third step, fourth step, fifth step, and sixth step;

extracting learning data, in which feature vectors in the learning exclusive period are excluded when the predetermined ending condition is met in the sixth step;

extracting feature vectors as observed vectors from sensor signals during the pre-designated period or newly obtained period out of all the multi-dimensional time series sensor signals;

calculating anomaly measurements of the observed vectors based on the observed vectors and the learning data; and comparing the calculated anomaly measurements of the observed vectors with the threshold for anomaly determination when the predetermined ending condition is met so as to detect an anomaly in a facility or an apparatus.

2. A method of detecting anomaly in a facility or apparatus by using multi-dimensional time series sensor signals outputted from sensors attached to the facility or apparatus during operation, comprising:

a learning step and a step of detecting anomaly, wherein:
at the learning step,
learning exclusion period is set based on a maximum value of anomaly measurement;
learned data is generated by, excluding sensor signals in the learning exclusion period from sensor signals in a pre-designated period out of all the multi-dimensional time series sensor signals; and
anomaly determining thresholds are calculated from the generated learned data;
at the step of detecting anomaly,
a normal anomaly model is generated by using the learned data;
feature vectors are extracted as observed vectors out of the multi-dimensional time series sensor signals;
anomaly measurements of the observed vectors are calculated by using the extracted observed vectors and the generated normal model; and
any anomaly in the facility or apparatus is detected by comparing the calculated anomaly measurements of the observed vectors and the anomaly determining thresholds.

3. The anomaly detecting method according to claim 2, wherein, at the learning step, generation of the learned data is accomplished by extracting feature vectors from sensor signals in the pre-designated period out of the multi-dimensional time series sensor signals, calculating the anomaly measurements of the extracted feature vectors, determining the period of exclusion out of the sensor signals in the pre-designated period by using information on the calculated anomaly measurements, and using the feature vectors of the sensor signals cleared of the determined period of exclusion.

4. The anomaly detecting method according to claim 3, wherein, at the learning step, calculation of the anomaly measurements of the extracted feature vectors is accomplished by figuring out feature vectors from remaining sensor signals out of the sensor signals in the pre-designated period after the extraction of a noted vector from the feature vectors, generating anomaly model by using the feature vectors obtained from the remaining sensor signals, and calculating the anomaly measurements on the basis of the distance between the generated normal model and the noted vector.

5. An apparatus to detect anomaly in a facility or apparatus by using multi-dimensional time series sensor signals outputted from sensors attached to the facility or apparatus during operation, comprising:
- a sensor signal accumulating unit that accumulates the multi-dimensional time series sensor signals;
- a feature vector extracting unit that extracts feature vectors from the multi-dimensional time series sensor signals;
- a learned data generating unit that excludes feature vectors in learning exclusion period from feature vectors in a learning period pre-designated by the feature vector extracting unit and generates learned data;
- a normal anomaly model generating unit that generates a normal anomaly model matching a feature vector at each time point by using the time point generated by the learned data generating unit;
- an anomaly measurement calculating unit that calculates anomaly measurements by using the feature vector at each time point extracted by the feature vector extracting unit and the normal model generated by the normal model generating unit;
- an exclusion period setting unit that sets learning exclusion period based on a maximum value of the anomaly measurements;
- a threshold calculating unit that calculates thresholds, regarding the learned data generated by the learned data generating unit, on the basis of the anomaly measurements calculated by the anomaly measurement calculating unit; and
- an anomaly detecting unit that detects any anomaly in the facility or apparatus by comparing each of the feature vectors calculated by the anomaly measurement calculating unit and thresholds calculated by the threshold calculating unit.

6. The anomaly detecting method according to claim 1, further comprising a seventh step of upon determining whether the first round or when the decreasing width calculated from the threshold set not later than the previous round-maximum anomaly measurement value is greater than an input effective lowering margin, setting the maximum anomaly measurement value as the threshold.

7. The anomaly detecting method according to claim 6, wherein:
- upon determining that the decreasing width is negative, counting up the number of withholdings is counted up;
- upon determining that the decreasing width is non-negative, maintaining the number of withholdings; and
- upon determining the number of repeats is a maximum value of repeats or the number of withholdings is greater than a maximum value of withholdings, performing the seventh step.

8. The anomaly detecting apparatus according to claim 5, wherein the wherein the apparatus is configured to:
- upon determining that a maximum value of the anomaly measurements meets a predetermined renewal conditions, set the maximum value of the anomaly measurements as a threshold for anomaly determination and set the exclusion candidate period as the learning exclusive period; and
- add a period of the maximum value of the anomaly measurements to the exclusion candidate period.

9. The anomaly detecting apparatus according to claim 5, wherein the apparatus is configured to:
- upon determining that the decreasing width is negative, count up the number of withholdings is counted up;
- upon determining that the decreasing width is non-negative, maintain the number of withholdings.

* * * * *